(12) United States Patent
Dickens

(10) Patent No.: US 8,340,931 B2
(45) Date of Patent: Dec. 25, 2012

(54) POWER GRID WITH COMPARISON OF DIFFERENCES IN REMOTE PHASOR CHANGES

(75) Inventor: Richard T. Dickens, W. Des Moines, IA (US)

(73) Assignee: Mehta Tech, Inc., Eldridge, IA (US)

( * ) Notice: Subject to any disclaimer, the term of this patent is extended or adjusted under 35 U.S.C. 154(b) by 637 days.

(21) Appl. No.: 12/573,373

(22) Filed: Oct. 5, 2009

(65) Prior Publication Data

US 2011/0082654 A1    Apr. 7, 2011

(51) Int. Cl.
  *G01R 21/00*  (2006.01)
(52) U.S. Cl. .......................................... 702/60
(58) Field of Classification Search .............. 702/57–60, 702/64, 65, 106, 182–185, 188; 700/298
  See application file for complete search history.

(56) References Cited

U.S. PATENT DOCUMENTS

| | | |
|---|---|---|
| 3,921,070 A | 11/1975 | Ringstad et al. |
| 4,148,087 A | 4/1979 | Phadke |
| 4,156,280 A | 5/1979 | Griess |
| 4,161,027 A | 7/1979 | Russell |
| 4,224,672 A | 9/1980 | Leleu et al. |
| 4,249,088 A | 2/1981 | Kleba et al. |
| 4,278,937 A | 7/1981 | Immler |
| 4,313,169 A | 1/1982 | Takagi et al. |
| 4,333,119 A | 6/1982 | Schoenmeyr |
| 4,447,843 A | 5/1984 | Massey |
| 4,450,497 A | 5/1984 | Bignell |
| 4,455,612 A | 6/1984 | Girgis et al. |
| 4,461,986 A | 7/1984 | Maynard et al. |
| 4,484,290 A | 11/1984 | Bagnall et al. |
| 4,547,726 A | 10/1985 | Premerlani |
| 4,570,231 A | 2/1986 | Bunch |
| 4,589,074 A | 5/1986 | Thomas et al. |
| 4,617,636 A | 10/1986 | Johns et al. |
| 4,669,024 A | 5/1987 | Stacey |
| 4,672,555 A | 6/1987 | Hart et al. |
| 4,680,706 A | 7/1987 | Bray |
| 4,689,709 A | 8/1987 | Isahaya |
| 4,701,689 A | 10/1987 | Yuan et al. |
| 4,723,189 A | 2/1988 | Larsen et al. |
| 4,812,995 A | 3/1989 | Girgis et al. |
| 5,027,297 A | 6/1991 | Garitty et al. |

(Continued)

OTHER PUBLICATIONS

Electric Power Network Tutorial: Basic Steady State & Dynamic Models for Control, Pricing and Optimization, DeMarco, IMA Tutorial: Electric Power Grids, Minneapolis, MN, Mar. 7, 2004.

(Continued)

*Primary Examiner* — Mohamed Charioui
(74) *Attorney, Agent, or Firm* — Woodard, Emhardt, Moriarty, McNett & Henry LLP

(57) ABSTRACT

The invention compares geographically remote locations on a power grid by determining at each location the amount of change to phasor measurements for a period of time, and then comparing the determined change values from each location to determine relative differences in values as an indicator of the stability of the power grid. One embodiment calculates the product of the node's most recent phasor and a complex conjugate of that nodes previous phasor sample to produce a phase difference phasor for that node. The various phase difference phasors are sent to a monitoring location (which may be local for one of the phasors) and comparisons made among the phase difference phasors to assess the amount of load imbalance among the nodes that are being compared.

24 Claims, 4 Drawing Sheets

U.S. PATENT DOCUMENTS

| | | | |
|---|---|---|---|
| 5,072,403 | A | 12/1991 | Johns |
| 5,181,026 | A | 1/1993 | Granville |
| 5,216,621 | A | 6/1993 | Dickens |
| 5,224,054 | A | 6/1993 | Wallis |
| 5,233,538 | A | 8/1993 | Wallis |
| 5,426,360 | A | 6/1995 | Maraio et al. |
| 5,428,549 | A | 6/1995 | Chen |
| 5,455,776 | A | 10/1995 | Novosel |
| 5,469,365 | A | 11/1995 | Diekema et al. |
| 5,483,153 | A | 1/1996 | Leeb et al. |
| 5,525,898 | A | 6/1996 | Lee, Jr. et al. |
| 5,587,917 | A | 12/1996 | Elms |
| 5,706,204 | A | 1/1998 | Cox et al. |
| 5,995,911 | A | 11/1999 | Hart |
| 6,415,244 | B1 | 7/2002 | Dickens et al. |
| 6,571,182 | B2 * | 5/2003 | Adamiak et al. ............ 702/64 |
| 2009/0240382 | A1 * | 9/2009 | Mitani et al. ............ 700/298 |

OTHER PUBLICATIONS

Power Delivery Systems Tutorial, for the CEC/PIER Demand Response Enabling Technologies Development Project, Sep. 17, 2003, Alexandra von Meier, Sonoma State University.

Power Phase Publication Chapters, Arturo Bretas, Nov. 30, 2001.

Synchronized Phasor Measurement in Protective Relays for Protection, Control, and Analysis of Electric Power Systems, Benmouyal et al, 29th Annual Western Protective Relay Conference, Spokane, Washington, Oct. 22-24, 2002.

Visualizing Real-Time Security Threats Using Hybrid SCADA/PMU Measurement Displays, Klump et al., Proceedings of the 38th Hawaii International Conference on System Sciences, 2005.

* cited by examiner

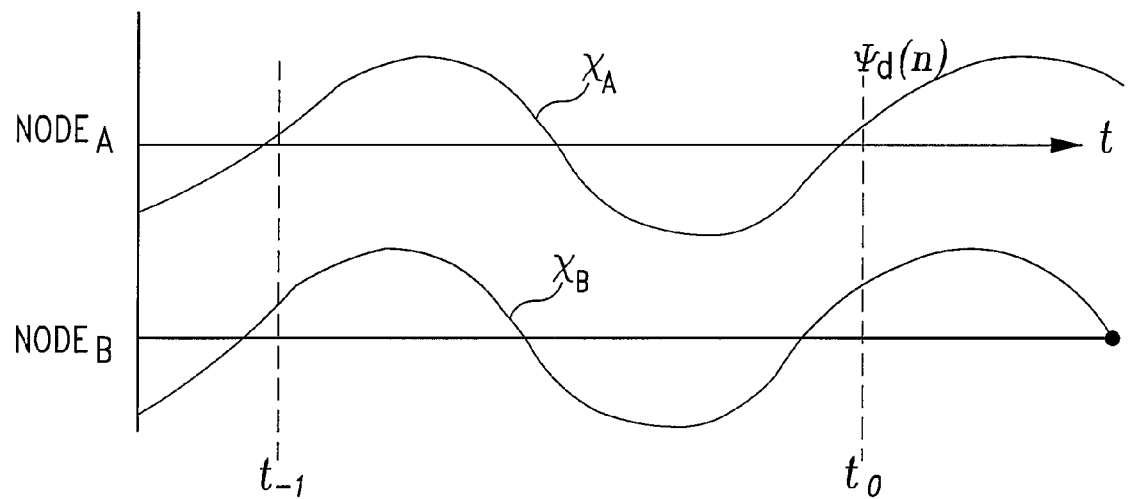
Fig. 1A
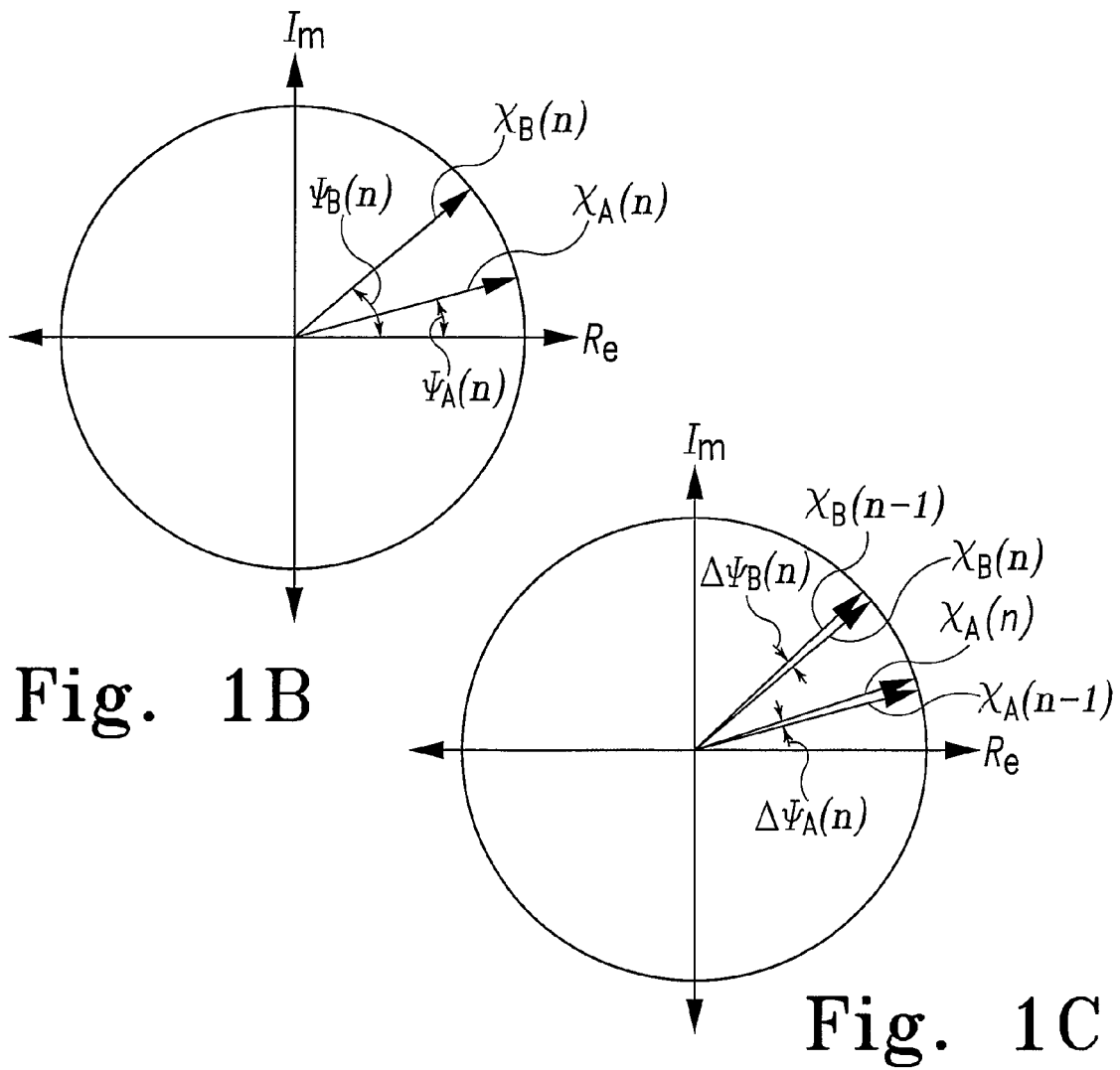
Fig. 1B
Fig. 1C

POWER GRID WITH COMPARISON OF DIFFERENCES IN REMOTE PHASOR CHANGES

BACKGROUND

The electrical monitoring system described herein relates to monitoring and/or control of changes within an electrical power grid. In particular, the electrical monitoring system concerns, at least in part, the detection and communication of data descriptive of such disturbances.

In the United States and most other countries, generating systems producing electrical power are typically interconnected in a power grid by high voltage alternating current (AC) three-phase electric power transmission lines. One reason power generating systems and their loads are interconnected with other power generating systems and their loads is to provide greater reliability in relation to cost. Interconnecting neighboring utilities through transmission systems allows effective sharing of reserves. As a result, each utility requires a smaller percentage reserve margin at a given level of reliability. Moreover, extensive interconnection of power systems may allow for greater use of generators that have lower operating costs.

However, there are also liabilities associated with larger size and interconnection of power systems. Long transmission lines introduce the problem of stability in addition to the problem of transmission power loss and expense of land acquisition, construction and maintenance. More interdependence among areas also means greater vulnerability to events far away, such as high loads, or generator outages, or transmission line faults, that can cause voltage and frequency fluctuations.

Optimization of the distribution of power throughout a power grid presents a non-trivial calculation. Generally data from various locations on the power grid are collected and analyzed with sophisticated computing systems, with the results being used to assess the performance of the grid. Depending upon the assessment, responses can be made, for examples, to add certain generating capacity, to remove other generating capacity, to disconnect various transmission lines, or to take such other action as may be appropriate. Typically, the computations are based in part on the monitored quantities of real and reactive power injected or consumed at various locations.

The modeling, monitoring and controlling process is made more difficult by the changing economic parameters governing electrical power generation, transmission, and distribution. One approach to address this issue of streamlining or automating the operation of transmission and distribution systems involves the obtaining of ever increasing amounts of data by remote sensing. However, there are often limits of reliable bandwidth capacity to and from the remote locations that make such an approach expensive or prohibitive.

During small time intervals, it is possible to store high resolution digitized waveforms and related information about transmission line voltages and currents, and to then retain that stored data long term when an anomalous condition arises. Unfortunately, data storage resources limit the amount of data that may be collected in this manner, and bandwidth cost and limitations inhibit remote access to this information in real time. The desire to capture data for a rapid succession of anomalous conditions also limits the amount of storage that may be allocated to a given data collection event. Moreover, real time transmission of data to centralized control systems requires a reliable substantial network and centralized processing capacity. Sometimes broadband connections to remote locations have reliability problems that correlate to the same causes of interruptions of electrical power in the grid, such as hurricanes, for example. There are typically more options for narrowband connections, and they may be more reliable and lower cost, yet they can not provide to remote locations the full amount of data that can be collected locally. Early detection and characterization of changes in an electrical power grid are desirable.

The line disturbance monitor shown in the patent to Bagnall et al., U.S. Pat. No. 4,484,290 receives analog signals representing voltage and current of transmission power lines and converts them to a digital representation. The monitor includes storage means for sequentially generated digital data representative of the sampled AC voltages and currents.

Phadke et al. have described a method of obtaining voltage phasors for use in detecting line disturbances which involves a recursive computation for the real and imaginary phasor components. This technique is discussed in "A New Measurement Technique for Tracking Voltage Phasors, Local System Frequency, and Rate of Change Frequency," IEEE Paper No. 82, SM 444-8, A. G. Phadke, J. S. Thorpe, and M. G. Adamiak (1982). In the Phadke et al. approach, a recursive equation is used to determine the phasor representation of the power line voltage based on digitized signal data. This phasor is subsequently used to calculate AC operating parameters such as phase angle, positive sequence voltage, and line synchronization parameters using a microprocessor-based routine.

U.S. Pat. No. 5,216,621 to Dickens is a source of additional information concerning one waveform storage approach and is hereby incorporated by reference. The '621 Dickens patent discloses a fault detection system for monitoring at least one operating parameter of an AC power transmission line including means connectable to the transmission line for providing an analog signal representative of the time varying value of the operating parameter. An analog-to-digital (A/D) converter coupled to an input means samples the analog signal and produces digital sample data representing the signal.

U.S. Pat. No. 6,415,244 to Dickens et al. is also incorporated by reference herein. The '244 Dickens et al. patent discloses other techniques to monitor electrical power by generating multiple data streams representative of the electrical power. The data streams are further processed to selectively record data associated with power anomalies, disturbances, or other events of interest. The record may include at least a pre-fault portion and a post-fault portion of each of the first or second data streams.

There remains a need for an improved electrical monitoring and control system for an electrical power grid that collects data from several remote locations. Moreover, there is a need for new power grid management techniques that provide remote digital disturbance monitoring for AC transmission lines to create situational awareness of power grid stability without overwhelming the data sampling and processing capabilities of electrical power generation and distribution provider. This includes the need to develop a monitoring system and techniques that can be used without precise synchronization of local time bases between remote locations, allowing for only general references to the line frequency itself, or other imprecise methods of synchronization, and avoiding cost and/or reliability issues that can be associated with some precise synchronization approaches.

Another pressing need is to provide techniques to create a robust, widely distributed and secure data measurement infrastructure over an electrical power grid with associated analysis and monitoring tools for better planning, operation, and improved reliability. Other benefits, improvements and solutions offered by the electrical power sensing and control system will become apparent from the following written description and accompanying drawings.

SUMMARY

The invention herein is defined by the claims, and reference should be made thereto for an accurate understanding of the scope of the invention, rather than to this summary or the accompanying disclosures of preferred embodiments. In general, the disclosures herein relate to a method for monitoring the stability of a power transmission system in geographically remote locations of a power grid. The remote locations on the power grid are analyzed in an improved manner, and the data from that analysis is collected and further analyzed at a common site.

In some embodiments, equipment at each of several remote locations calculates the product of the location's most recent phasor sample and that location's previous phasor sample by multiplying the one phasor sample times the complex conjugate of the other. The calculated product can be then converted to an angle for which a tangent value is determined, or directly sent as a phasor value to a monitoring location (which may be local for one of the sampling locations).

While samples can be taken synchronously for some embodiments, ideally no precise synchronizing is done between geographically remote locations. Some embodiments of this disclosure potentially save costs, reduce complexity, increase reliability and increase speed in the data collection and analysis process. While the amount of delay between the two sample times at a given location can be fixed at any relatively short time, it is most preferred that the delay is equal to the time for 3¾° or 7½° of the period of the power line frequency. Also preferred are 15°, 30°, 90°, 180° or 360° or some other multiple of 90° of the period of the power line frequency. When the delay is other than 360° or a multiple thereof, differences are corrected to eliminate the expected phase advance.

At the geographically separate monitoring locations, comparisons are made between phase difference signals (for examples, a phasor or an angle tangent value) to assess the characteristics of the grid, such as the amount of load imbalances between the two locations that are being compared. These comparisons can be done directly, or it can be done by comparison with past stored values to determine how much each value is changing. The use of exponential averaging or other techniques may be used to assess changes. In one embodiment where phasor values are transmitted to the monitoring location, that is done by determining "relative" phase change rate phasors by calculating the product of one incoming phase difference phasor with the conjugate of another incoming phase difference phasor.

In another embodiment where angle tangent values are transmitted to the monitoring location, that is done by determining "relative" phase change rate indicators by subtracting one incoming angle tangent value from another. In further embodiments the system is not only monitored, but is also controlled in response to the relative phase change indicators, whether they be angle tangent derived, or phase difference phasor derived, or otherwise derived.

BRIEF DESCRIPTION OF THE DRAWINGS

FIG. 1A shows the voltage waveforms of one phase of a three-phase electric power transmission system, such as would be part of a power grid, at each of two geographically remote locations, $node_A$ and $node_B$.

FIG. 1B represents the voltages at $node_A$ and $node_B$ from FIG. 1A as sampled complex phasors $X_A(n)$ and $X_B(n)$ having the corresponding phase angles $\Psi_A(n)$ and $\Psi_B(n)$.

FIG. 1C represents voltages at $node_A$ and $node_B$ from FIG. 1A being compared to comparable signals from equally spaced previous sampling intervals.

DESCRIPTION OF THE ILLUSTRATED EMBODIMENTS

Figure 2:
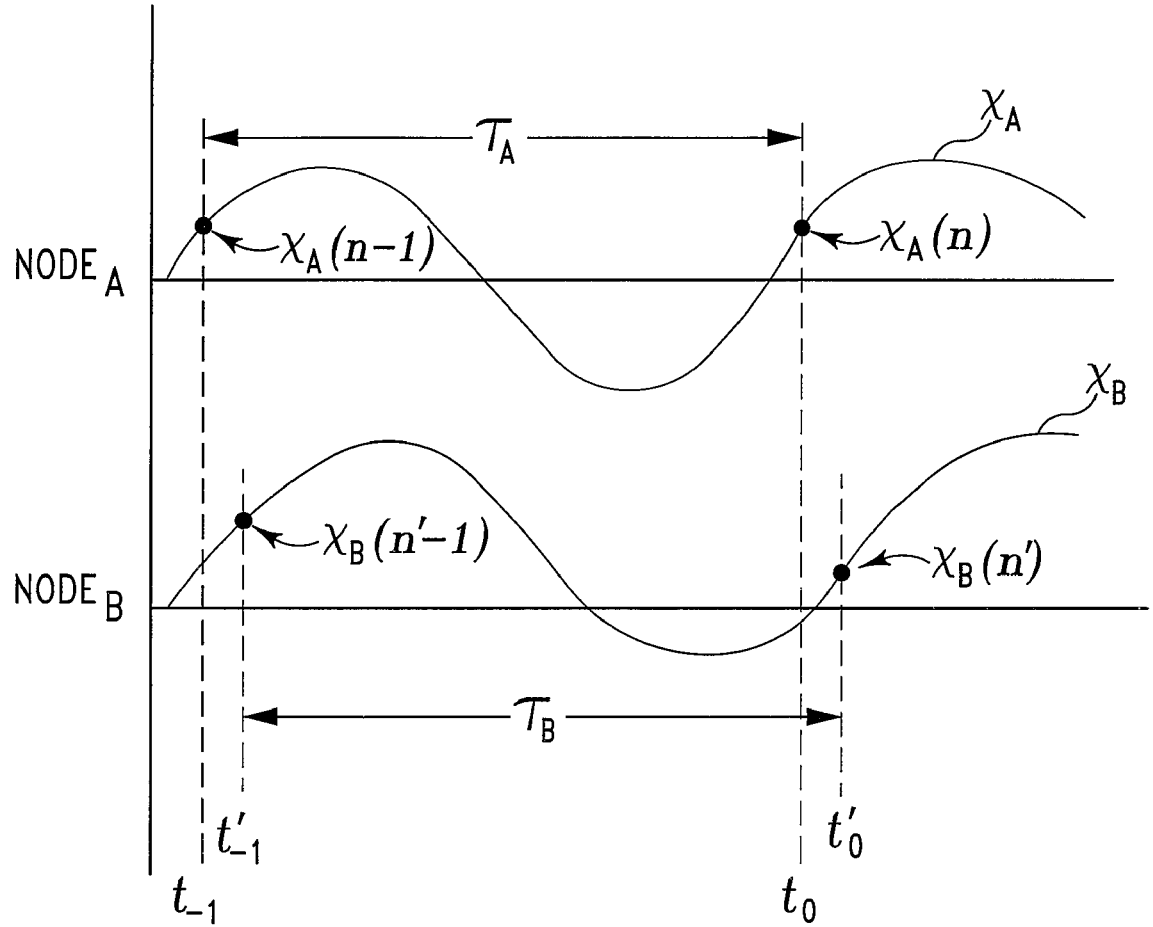
FIG. 2 shows the voltage waveform of the sample-to-sample phase angle change in $X_A(n)$ and $X_B(n)$ like those illustrated in FIG. 1C with equally spaced sampling intervals that do not start at the same time.

Reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present disclosure relates generally to the field of AC electric power transmission line systems, such as may be a part of an electric power grid. These are preferably, but not necessarily three phase systems. More specifically, the present disclosure relates to methods and techniques for monitoring and possibly also controlling a power grid from remote locations.

FIG. 1A shows voltage waveforms of one phase of a three-phase electric power transmission system in a power grid at two geographically remote locations, $node_A$ and $node_B$. $X_A$ and $X_B$ correspond to the voltage and phase of the alternating current (AC) voltage appearing at $node_A$ and $node_B$ at a given time. As shown in FIG. 1B, the $X_A$ and $X_B$ may be represented as the sampled complex phasors $X_A(n)$ and $X_B(n)$ having the corresponding phase angles $\Psi_A(n)$ and $\Psi_B(n)$. Referring to FIG. 1C, at a given time $t_o$, the node to node phase difference between the $node_A$ and $node_B$ is given by $\Psi_d(n)=\Psi_A(n)-\Psi_B(n)$. Similarly, the node to node phase difference at time $t_{-1}$ is $\Psi_d(n-1)=\Psi_A(n-1)-\Psi_B(n-1)$.

As shown in FIG. 2, a sample-to-sample phase angle change in $X_A(n)$ and $X_B(n)$ may be calculated by subtracting the phase of the previous phasor sample from the phase of the present complex phasor. This can be done without precisely synchronizing the sample at $node_A$ and with the sample at $node_B$. Preferably the sampling intervals are the same length, each being integer multiples of a fraction of the period of the power line cycle, but they could be different integer multiples, or less preferably some other intervals. Asynchronous sampling between remote locations is preferred because it is less complicated and less expensive and potentially more reliable. One could less preferably synchronize the start of one sampling interval to another that is remotely located from it.

Illustratively, the phase difference angle for $node_A$ and $node_B$ are $$\Delta\Psi_A(n)=\Psi_A(n)-\Psi_A(n-1) \text{ and}$$

$$\Delta\Psi_B(n)=\Psi_B(n)-\Psi_B(n-1), \text{ respectively.}$$

Thus, the relative change in the sample-to-sample phase angle change between the $node_A$ and $node_B$ is $$\Delta\Psi_{AB}(n)=\Delta\Psi_A(n)-\Delta\Psi_B(n),$$

which reflects the instantaneous change in the phase relationship between the $node_A$ and $node_B$ during the time period $\Delta t=t_o-t_{-1}$. Moreover, $\Delta\Psi_{AB}(n)$ provides an indication of the stability of the relationship between $node_A$ and $node_B$ and thus of the stability of the power grid itself. That is, the convergence and divergence of the phase relationship changes as grid parameters change, such as when generators and loads are added to and subtracted from the power grid, or transmission line faults or interruptions occur, during the time period $\Delta t=t_o-t_{-1}$.

It will be appreciated by those skilled in the art that the relative phase difference $\Psi_d(n)$ between phasors $X_A(n)$ and $X_B(n)$ tends to vary as loads and generating capacity are applied and removed from the power grid, or as faults or other changes occur in the grid. Under certain conditions, these variations can lead to instability in the Power transmission system. Thus, it is possible to relate the stability of the power grid to the node-to-node phase difference, $\Psi_d(n)$, between the various nodes in the power grid. However, this has the disadvantage of requiring synchronization between the various sampling means throughout the power grid, with substantial data transfer to a central computing location. A better approach is to compare the relative rates of phase change at $node_A$ and $node_B$ as an indication of the stability of the power grid, as related to $node_A$ and $node_B$. This approach preferably permits the avoidance of the overhead of synchronizing local sampling clocks, or compensating for network jitter, delay, or buffering, and permits compact data computed in a distributed fashion, and transmitted with less bandwidth, imposing less burden on the common location for comparison and control.

Referring now to FIG. 2, it will be appreciated that the AC power frequency is expected to be highly stable, as a condition of overall system stability. However, relative changes in phase difference angle can give insight into the stability of the AC power grid. This is true even when remote sample times and sample rates are not fully aligned. Illustratively, as shown in FIG. 2, obtaining the sample of the AC transmission line voltage at $node_A$ at times $t_{-1}$ and $t_0$ and at $node_B$ at time $t_{-1}'$ and $t_o'$ leads to $$\Delta\Psi_A(n)=\Psi_A(n)-\Psi_A(n-1) \text{ and}$$

$$\Delta\Psi_B(n')=\Psi_B(n')-\Psi_B(n'-1), \text{ respectively.}$$

Thus, the relative change in the sample-to-sample phase angle change between $node_A$ and $node_B$ is $$\Delta\Psi_{AB}(n,n')=\Delta\Psi_A(n)-\Delta\Psi_H(n'),$$

While there are shown equally spaced sampling intervals measuring a single cycle, this is for illustrative purposes only. The actual sampling interval may be preferably a multiple of a fraction of a cycle, with comparisons being made between the actual value noted and the predicted value expected at that interval. In this way, phase errors accumulate over the interval. Of course it is permissible, but not at all necessary, to have identical or precisely synchronized start times for sampling intervals. Preferably all sampling intervals are of approximately the same length.

Figure 3:
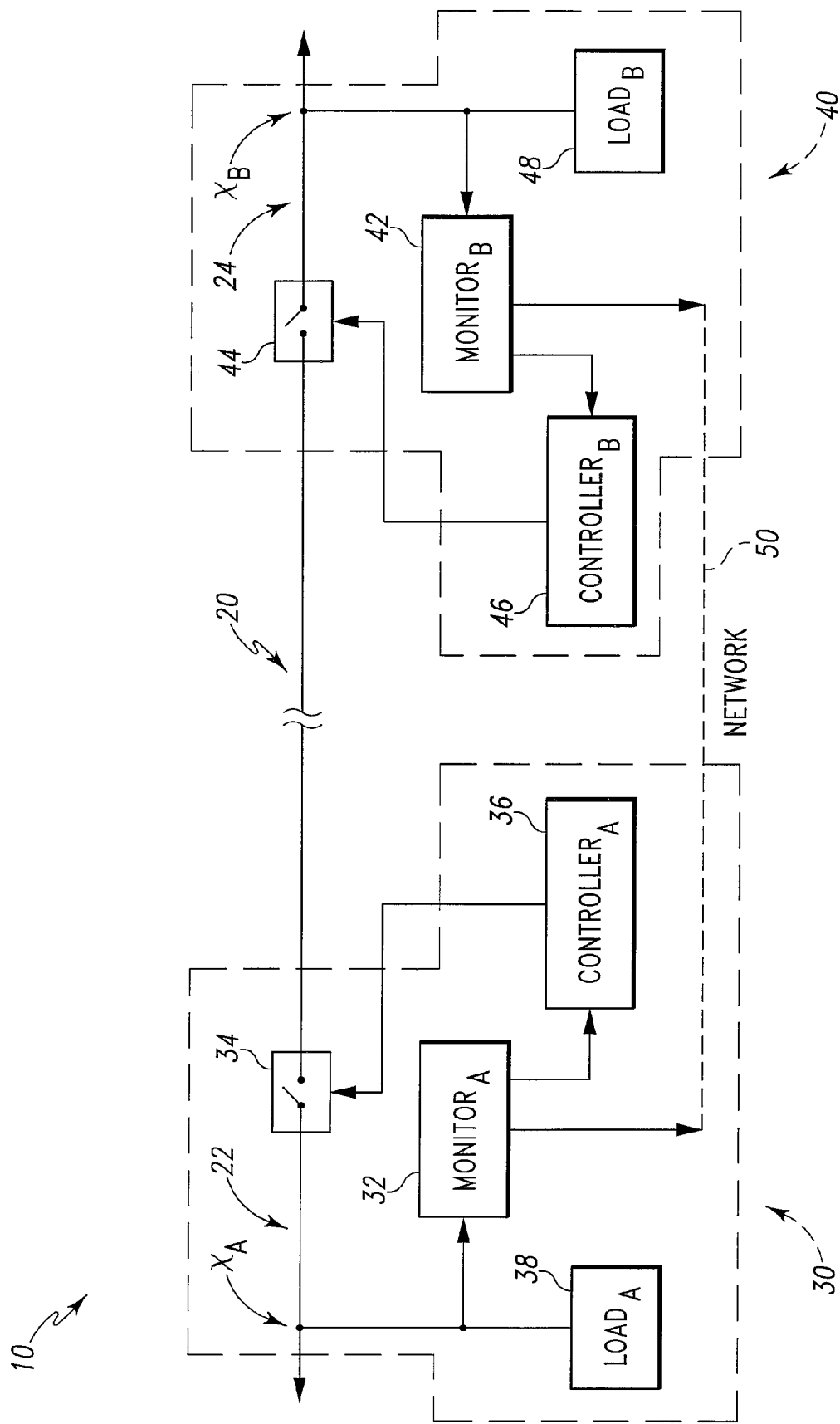
FIG. 3 is a block diagram of an embodiment of a system for monitoring the stability of an alternating current electric power transmission system having voltages as shown in FIG. 1A through FIG. 2, and which is controlled by a peer-to-peer relationship.

Referring now more particularly to FIG. 3, there is a block diagram of one embodiment of a system for monitoring the stability of an alternating current (AC) three-phase electric power transmission system 10 that is part of a transmission grid. Power transmission system 10 comprises a transmission line 20 operably coupling $node_A$ 30 at one location to $node_B$ 40 at a different remote location. For simplicity of description, power transmission system 10 is shown only in part, recognizing that an actual power grid would be more complex, including one or more generators, other transmission lines, and typically other nodes at other locations, as well as other items not shown. $Node_A$ 30 includes $monitor_A$ 32 and $load_A$ 38 operably coupled by a power transmission line 22 from other parts of the grid (not shown) to $circuit breaker_A$ 34. $Circuit breaker_A$ 34 provides a controlled AC power transmission path for AC power between power transmission line 22 and power transmission line 20. $Node_A$ 30 also includes $controller_A$ 36 operably coupled from $monitor_A$ 32, and provides a control output operably coupled to the control input of $circuit breaker_A$ 34. In addition, $node_A$ 30 operably couples to network 50 to facilitate sharing of data between the respective nodes within power transmission system 10.

The components and operation of $node_B$ 40 comprising $monitor_B$ 42, $circuit breaker_B$ 44, $controller_B$ 46, and $load_B$ 48, are substantially the same as the corresponding portions of $node_A$ 30.

$Monitor_A$ samples the AC transmission line voltage present at $node_A$ of power transmission circuit 22 to produce samples of a phasor $X_A(n)$ representing the magnitude and phase of the AC at $node_A$ 30 on transmission line 22. This is as outlined in the discussions about FIGS. 1A-C and FIG. 2 above. While production of phasors is preferably based on voltage as described herein, one could alternatively use other parameters, such as current, or power, to generate useful phasors.

The sample rate used by $monitor_A$ is derived from a locally generated clock source with sample period $\tau_A$. $Monitor_A$ produces a phase difference phasor $\Delta X_A(n)$ by calculating the product of the most recent phasor $X_A(n)$ with the complex conjugate of the previous phasor sample $X_A(n-1)$:

$$\Delta X_A(n)=X_A(n) \times X^*_A(n-1).$$

The phase difference phasor $\Delta X_A(n)$ represents the phase change in $X_A(n)$ over a desired sample period $\tau_A$. The phase difference phasor $\Delta X_A(n)$ is then sent via network 50 to $node_B$ 40.

Similarly, $monitor_B$ 42 samples the AC voltage on transmission line 24 at $node_B$ 40 to produce a phasor $X_B(n)$, which represents the magnitude and phase of the AC voltage at $node_B$ 40. The sample rate of $monitor_B$ is governed by a locally generated sample clock with sample period $\tau_B$, wherein the sample period $\tau_B$ preferably has a value close to or approximately the same as the sample period $\tau_A$. $Monitor_B$ 42 operates upon $X_B(n)$ to produce a phase difference phasor $\Delta X_B(n)$:

$$\Delta X_B(n)=X_B(n) \times X^*_B(n-1).$$

The phase difference phasor $\Delta X_B(n)$ represents the phase change in $X_B(n)$ over a sample period $\tau_B$. Similar to $node_A$ 30, $node_B$ 40 provides the phase difference phasor $\Delta X_B(n)$ to $node_A$ 30 as well as receives the phase difference phasor $\Delta X_A(n)$ from $monitor_A$ 32. Upon receiving the phase difference phasor $\Delta X_B(n)$, $monitor_A$ produces a relative phase change rate phasor $S_{AB}(n)$ by calculating the product of the phase difference phasor of $node_A$ and the conjugate of the phase difference phasor of $node_B$:

$$S_{AB}(n)=\Delta X_A(n) \times \Delta X^*_B(n).$$

The relative phase change rate phasor $S_{AB}(n)$ provides an indication of the stability of power grid 20 by tracking the relative change of phase differences between node$_A$ 30 and node$_B$ 40. Likewise, monitor$_B$ calculates a relative phase change rate phasor $$S_{BA}(n)=\Delta X_B(n)\times \Delta X^*_A(n).$$

By sending the phase difference phasors over the network, the difficulty of synchronization is avoided because the expected phase difference is determined by the sample interval. Likewise, small variations between local sample clocks are substantially compensated for by looking at relative differences between the phase changes.

In addition, some embodiments of monitor$_A$ 32 include a further step of filtering the calculated relative phase change rate phasor, $S_{BA}(n)$, or the relative phase change value $\Delta\Psi_{AB}(n)$. Although various low pass filters may be employed, the preferred filtering technique includes calculating the exponential average of $S_{BA}(n)$ or $\Delta\Psi_{AB}(n)$. By way of example, without limitation, alternative filtering algorithms and techniques further include digital band pass filtering. One of the possible benefits of filtering is to reduce the effects of noise that may result from the original determination of phase differences.

Some alternative embodiments of monitor$_A$ 32 and monitor$_B$ 42 exchange the phase value $\Delta\Psi_A(n)$ and $\Delta\Psi_B(n)$ of the phase difference phasors $\Delta X_A(n)$ and $\Delta X_B(n)$ respectively, instead of providing the complex phasor representations of $\Delta X_A(n)$ and $\Delta X_B(n)$. Still other embodiments provide the tangent value of the phase value of the phase difference phasors. For tangent value determinations, the period for sampling the AC voltage is preferably selected to insure that the expected change in phase angle is small. Examples of sampling intervals when tangent values are calculated are preferably 3¾° or 7½°. As a result, the tangent value of the phase difference phasor approximates the angle of the phase difference phasor. Similarly, in other embodiments the sample period is selected to be coincident with expected frequency of the AC power line voltage. An indication of the relative phase change rate phasor between node$_A$ and node$_B$ is obtained by subtracting the tangent values of the phase of the phase difference phasors $\Delta X_A(n)$ and $\Delta X_B(n)$.

Finally, monitor$_A$ 32 provides the monitored parameters reflecting system stability to controller$_A$ 36. Controller$_A$ 36 uses the parameters to selectively open and close the contact of breaker$_A$ 34 as necessary to address instability of the power grid or at least as between node$_A$ and node$_B$. Illustratively, monitor$_A$ 32 may provide $S_{AB}(n)$, $\Delta\Psi AB(n)$, $\tan(\Psi_{AB}(n))$, or a filtered version of similarly calculated parameters as would occur to one skilled in the art.

Figure 4:
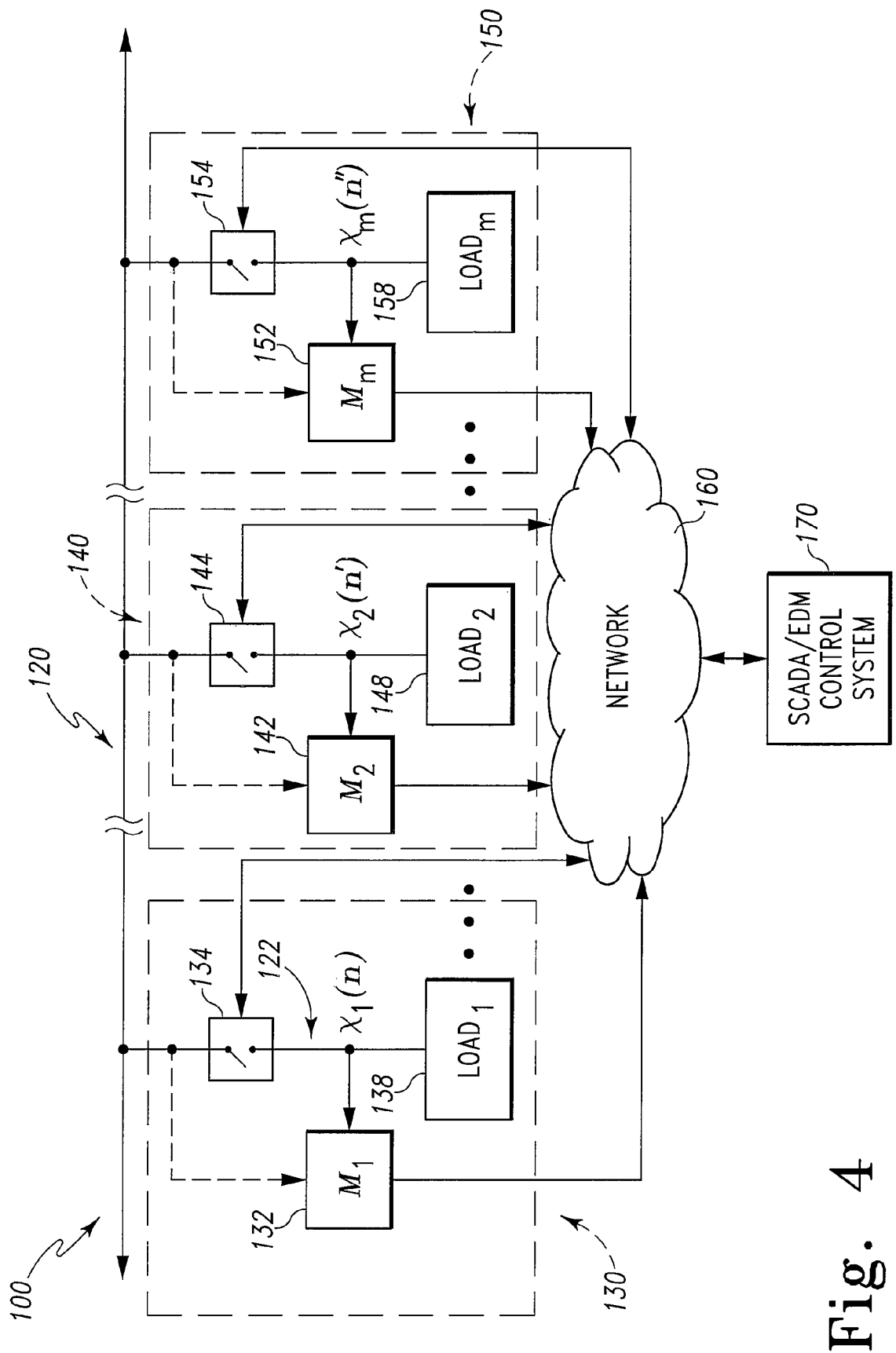
FIG. 4 is a block diagram of an alternative embodiment to FIG. 3, showing a system for monitoring the stability of an alternating current electric power transmission system having voltages as shown in FIG. 1A through FIG. 2 and which is controlled by a central SCADA/EDM system.

In contrast to the above peer to peer system, FIG. 4 shows a centrally controlled system for monitoring the stability and controlling an alternating current (AC) three-phase electric power transmission system 100. Although only one phase of the three-phase electric power transmission system 100 is shown, it will be understood that this is for the sake of simplicity of illustration and not meant as a limitation. Similar to power transmission system 10 of FIG. 2, power transmission system 100 comprises a power transmission line 120 operably coupling a multiplicity of nodes, illustrated here as node$_1$ 130, node$_2$ 140, and node 150, each of which, illustratively, are geographically remote from one another.

Node$_1$ 130 includes monitor M$_1$ 132 and load$_1$ 138 operably coupled by a power transmission circuit 122 to circuit breaker$_1$ 134. Load$_1$ 138 and other loads described herein would typically be a substation coupled to further power distribution lines that lead to further loads and/or localized generating capacity such as solar or wind based generators. As an alternative to one or more of the loads described herein, one could substitute a power company generator, or other items found on a power grid.

Circuit breaker$_1$ 134 provides a controlled AC power transmission path for AC power to flow between power transmission line 120 and power transmission line 122 of Node$_1$ 130. Monitor M$_1$ 132 and circuit breaker$_1$ 134 also operably couple via a network 160 to an SCADA/EDM control system 170. However, unlike node$_A$ 30 of FIG. 3, circuit breaker$_1$ 134 receives control information and commands through network 160. This allows control system 170 to provide centralized governance of the power transmission system 100. The centralized governance may be at a location that is geographically separate from any of nodes 130 to 150, or may be located at, for example, node 140.

Otherwise, monitor M$_1$ 132 operates similarly to monitor$_A$ 32 of FIG. 3 to sample the AC voltage of power transmission line 122 to create a phasor representation $X_1(n)$ of the power transmission system 100 at node$_1$ 130. The sample rate of monitor M$_1$ is governed by a locally generated sample clock with sample period $\tau_1$, wherein the sample period $\tau_1$ is comparable to those described above. Monitor M$_1$ 132 takes two adjacent samples of $X_1(n)$ and produces from them a phase difference phasor $\Delta X_1(n)$:

$$\Delta X_1(n)=X_1(n)\times X^*_1(n-1).$$

The components and operation of node$_1$ 130 through node$_m$ 150 and their corresponding elements therein operate and are substantially the same as the corresponding portions of node$_1$ 130. Thus, it will be understood that Monitor M$_2$ is operably coupled to and samples the AC voltage of power transmission system 100 at node$_2$ 140 to create a phasor representation $X_2(n')$ with a sample period $\tau_2$. Similarly, monitor M$_m$ samples the AC voltage of power transmission system 100 at node$_m$ 150 to create a phasor representation $X_m(n'')$ with a sample period $\tau_3$. It will be understood that the nomenclatures "n'" and "n''" of the phasor representations $X_{-2}(n')$ and $X_m(n'')$ represents the preferably non-synchronous sampling. It follows that monitor M$_2$ 142 and M$_m$ 152 produces phase difference phasors $$\Delta X_2(n')=X_2(n')\times X^*_2(n'-1) \text{ and}$$

$$\Delta X_m(n'')=X_m(n'')\times X^*_m(n''-1) \text{ respectively.}$$

Representations of the various phase difference phasors of the various nodes 1 through m are sent via network 160 to the control system 170 which then calculates the various combinations of relative phase change rate phasors. This allows the state of the power transmission system to be modeled by calculating the set of phase difference phasors relatively to each of the other m−1 nodes, as outlined in connection with FIG. 3. By having distributed phase difference phasor calculations, a computational advantage and a transmission bandwidth advantage may be gained, potentially resulting in an overall reduction in complexity, reliability and cost of the system.

The above embodiments are to be considered as illustrative and not restrictive in character, it being understood that all changes and modifications that come within the spirit of the invention are desired to be protected. As one example, while the above description has been described as preferably related to monitoring of power transmission lines in a grid, the monitoring may also be extended to local distribution lines as well.

What is claimed is:

1. A method for monitoring the stability of a power transmission system at a monitoring location by referencing geographically remote nodes; comprising:
   (a) taking a first sample of an AC power line parameter at a first node location using a first monitor to produce a first phasor representing the AC power line parameter at the first node,
   (b) taking a second sample of an AC power line parameter using said first monitor after a first time interval to produce a second phasor representing the AC power line parameter at the first node,
   (c) calculating from the first and second phasors, the product of one times the complex conjugate of the other, and using the result to produce a phase difference indicator for the first node;
   (d) sending the phase difference indicator for the first node to the monitoring location over an electronic network;
   (e) taking a third sample of an AC power line parameter at a second node location geographically remote from the first using a second monitor to produce a third phasor representing the AC power line parameter,
   (f) taking a fourth sample of an AC power line parameter at the second node using said second monitor after a second time interval to produce a fourth phasor representing the AC power line parameter at the first node,
   (g) calculating from the third and fourth phasors, the product of one times the complex conjugate of the other, and using the result to produce a phase difference indicator for the second node;
   (h) sending the phase difference indicator for the second node to the monitoring location over said electronic network; and
   (i) calculating a first relative phase change rate indicator using at least a first processor at the monitoring location from the phase difference indicators of the first node and the second node.

2. The method of claim 1 which additionally controls the power transmission system comprising opening a circuit of the power transmission system in response to an analysis that incorporates calculated first relative phase change rate indicator among its criteria for control of the power transmission system.

3. The method of claim 1 in which said first time interval and said second time interval are substantially the same length of time.

4. The method of claim 3 in which said first time interval and said second time interval are substantially an integer multiple of a fraction of the power line frequency.

5. The method of claim 4 in which said first time interval and said second time interval either 3¾° or 7½° of the period of the power line frequency.

6. The method of claim 3 in which said first time interval and said second time interval are not synchronized with one another beyond reference to the power line frequency.

7. The method of claim 1 in which said sending the phase difference phasor for the first node is to a monitoring location that is located at the first geographic location and said calculating is done at a monitoring location at the first geographic location.

8. The method of claim 1 in which said calculating at a monitoring location is done at a location different from either said first or second geographic location.

9. The method of claim 1 which additionally includes:
   (j) taking a fifth sample of an AC power line parameter at a third node location geographically remote from the first and second to produce a fifth phasor representing the AC power line parameter,
   (k) taking a sixth sample of an AC power line parameter at the third node after a third time interval to produce a sixth phasor representing the AC power line parameter at the first node,
   (l) calculating from the fifth and sixth phasors, the product of one times the complex conjugate of the other, and using the result to produce a phase difference indicator for the third node;
   (m) sending the phase difference indicator of the third node to the monitoring location; and
   (n) calculating from the phase difference indicators of either the first or second node and the third node a product of one times the complex conjugate of the other to produce a second relative phase change rate indicator.

10. The method of claim 9 in which said first, second and third time intervals are substantially the same length of time.

11. The method of claim 9 in which said first, second and third time intervals are substantially an integer multiple of a fraction of the power line frequency.

12. The method of claim 9 in which said first, second and third time intervals are asynchronous with one another.

13. The method of claim 1 in which said first and second phase difference indicators are each phasors.

14. The method of claim 13 in which said calculating a first relative phase change rate indicator takes the product of the first and second phase difference indicators by multiply one times the complex conjugate of the other.

15. The method of claim 1 in which said first and second phase difference indicators are each tangent values of angles derived from phasors.

16. The method of claim 15 in which said calculating a first relative phase change rate indicator takes the difference between the first and second phase difference indicators.

17. The method of claim 1 in which in each of said four taking steps, said AC power line parameters are voltage.

18. A method for determining at a common monitoring location, useful information about a power transmission system including a power grid, comprising:
   (a) receiving at a first processor a first phase difference indicator corresponding to a first location on the power grid,
   (b) receiving at said first processor a second phase difference indicator corresponding to a second location on the power grid, remote from the first location,
   (c) calculating, using said first processor, a first relative phase change rate indicator at the monitoring location from the first and second phase difference indicators received, and
   (d) using the calculated first relative phase change rate indicator as an indicator of the stability of the power transmission system's operation.

19. The method of claim 18 in which the step of using additionally includes the step of:
   (e) controlling at least a portion of a power transmission system in response to an analysis that incorporates said first relative phase change rate indicator.

20. The method of claim 18 in which said calculating is done using first and second phase difference indicators that are each phasors.

21. A method useful in the monitoring of the stability of a power transmission system comprising:

(a) taking a first sample of an AC power line parameter using a first monitor to produce a first phasor representing the AC power line parameter;
(b) taking a second sample of the same AC power line parameter using said first monitor after a first time interval to produce a second phasor representing the AC power line parameter;
(c) calculating from the first and second phasors, the product of one times the complex conjugate of the other, and using the result to produce a phase difference indicator for the first node;
(d) transmitting to a remote location over an electronic network the phase difference indicator for the first node; and
(e) repeating the prior steps sufficiently frequently to allow for use of the transmitted indicators in monitoring of the stability of the power transmission system over time.

22. The method of claim 21 in which said first time interval is not substantially synchronized with a similar step at a remote location.

23. The method of claim 22 in which said phase difference indicator is a phasor.

24. The method of claim 22 in which said parameter is voltage.

* * * * *